(12) United States Patent
Yamamoto et al.

(10) Patent No.: US 10,995,930 B2
(45) Date of Patent: May 4, 2021

(54) VEHICLE LIGHT

(71) Applicant: MAZDA MOTOR CORPORATION, Hiroshima (JP)

(72) Inventors: Naoki Yamamoto, Hiroshima (JP); Yoshiaki Nakaya, Hiroshima (JP); Toshiaki Wakabayashi, Hiroshima (JP); Takahiro Yamamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/683,887

(22) Filed: Nov. 14, 2019

(65) Prior Publication Data

US 2020/0166193 A1 May 28, 2020

(30) Foreign Application Priority Data

Nov. 22, 2018 (JP) .............................. JP2018-219747

(51) Int. Cl.
*F21S 43/31* (2018.01)
*F21S 41/36* (2018.01)
*F21S 43/239* (2018.01)

(52) U.S. Cl.
CPC ............... *F21S 43/31* (2018.01); *F21S 41/36* (2018.01); *F21S 43/239* (2018.01)

(58) Field of Classification Search
CPC ........... F21S 43/31; F21S 43/239; F21S 41/36
See application file for complete search history.

(56) References Cited

U.S. PATENT DOCUMENTS

| | | | | |
|---|---|---|---|---|
| 2008/0186726 | A1* | 8/2008 | Okada | B60Q 1/0041 362/509 |
| 2014/0160778 | A1* | 6/2014 | Nakada | F21S 43/249 362/511 |
| 2016/0102834 | A1* | 4/2016 | Yamada | F21S 43/247 362/511 |
| 2017/0234501 | A1* | 8/2017 | Hanami | G02B 6/0036 362/511 |
| 2017/0241616 | A1* | 8/2017 | Nakashima | F21S 43/247 |

FOREIGN PATENT DOCUMENTS

| | | |
|---|---|---|
| DE | 603 05 095 T2 | 12/2006 |
| EP | 1 715 244 A1 | 10/2006 |
| EP | 1 953 451 A2 | 8/2008 |
| EP | 2 108 883 A2 | 10/2009 |
| EP | 2 762 770 A1 | 8/2014 |
| FR | 3 019 263 A1 | 10/2015 |
| JP | 2015039912 A | 3/2015 |
| WO | 2014/105470 A1 | 7/2014 |

* cited by examiner

*Primary Examiner* — Rajarshi Chakraborty
*Assistant Examiner* — Nathaniel J Lee
(74) *Attorney, Agent, or Firm* — Studebaker & Brackett PC (57) ABSTRACT

A rear light is a light disposed in a rear portion of a vehicle, and includes: a light source; a light-transmitting plate that guides incident light from the light source; and a dot portion that is disposed on the light-transmitting plate and reflects incident light to the outside of the vehicle with different reflection intensities depending on positions on the light-transmitting plate.

17 Claims, 8 Drawing Sheets

VEHICLE LIGHT

CROSS-REFERENCE TO RELATED APPLICATION

This application claims priority to Japanese Patent Application No. 2018-219747 filed on Nov. 22, 2018, the disclosure of which including the specification, the drawings, and the claims is hereby incorporated by reference in its entirety.

BACKGROUND

The present disclosure relates to a vehicle light.

A display board including a light source and a light guide board has been used to date for, for example, a character illuminated type license plate of a vehicle.

Japanese Patent Publication No. 2015-39912 describes a display board in which a dot group constituted by a large number of recesses and projections is provided on a surface of a transparent light guide board facing a reflector such that the surface area of the dots increases as the distance form a light source increases, and minute projections and recesses are formed on the front surfaces of the dots and on the back surfaces of the light guide board such that numbers and characters on a license plate can be uniformly illuminated.

It is generally known that light-emission intensity decreases as the distance from the light source increases. In some cases of a vehicle light, for example, a structure in which light emission intensity increases at an intended position independently of the distance from the light source is demanded under the request for aesthetic design.

SUMMARY

In view of the foregoing situations, the present disclosure provides a vehicle light with aesthetic design capable of increasing light-emission intensity at an intended position, independently of a distance from a light source.

A vehicle light disclosed here is a vehicle light disposed in a front portion or a rear portion of a vehicle and includes a light source; a light-transmitting plate that guides incident light from the light source; and a reflection portion disposed on the light-transmitting plate, the reflection portion being configured to reflect the incident light toward outside of the vehicle with an reflection intensity that varies depending on a position on the light-transmitting plate.

With the presence of the reflection portion in the light-transmitting plate, the light-transmitting plate seems to emit light strongly when seen from the outside of the vehicle because of reflection of incident light on the reflection portion. In this vehicle light, the reflection portion may be configured such that the reflection intensity of incident light increases in a region where the light-emission intensity of the light-transmitting plate needs to be increased, whereas the reflection intensity of incident light decreases in a region where the light-emission intensity needs to be reduced, for example. Then, it is possible to provide the vehicle light with aesthetic design capable of increasing light-emission intensity at an intended position, independently of the distance from the light source.

In one embodiment, the reflection intensity of the incident light on the reflection portion may gradually change in accordance with a distance from the light source.

In this configuration, the reflection portion is configured to change the reflection intensity of incident light gradually so that a natural change of light-emission intensity can be expressed. Accordingly, the light having in such a light-emission mode that the light-emission intensity gradually decreases from a position where the light-emission intensity needs to be increased to a position where the light-emission intensity needs to be reduced can be obtained, and thus, aesthetic design of the vehicle light can be enhanced.

In one embodiment, the vehicle light may include a main light-emitting part that illuminates space in front of or at rear of the vehicle, the light-transmitting plate extends from the main light-emitting part in a vehicle longitudinal direction, and is disposed at a side surface of the vehicle, the light-transmitting plate may include the light source at an end opposite to a position where the main light-emitting part is disposed, and the reflection intensity of the incident light on the reflection portion may gradually increase toward the main light-emitting part.

The main light-emitting part is disposed at one end of the light-transmitting plate extending in the vehicle longitudinal direction, whereas the light source is disposed at the other end. In this embodiment, the reflection intensity of incident light by the reflection portion is gradually increased as the distance to the main light-emitting part decreases, that is, as the distance from the light source increases, so that a natural decrease of the light-emission intensity continuous from the main light-emitting part can be expressed. Then, the vehicle light with aesthetic design capable of providing a natural light-emission mode can be provided.

In one embodiment, the reflection intensity of the incident light on the reflection portion may gradually change in a vehicle longitudinal direction.

With this configuration, a light-emission mode in which the light-emission intensity gradually increases or gradually decreases in the vehicle longitudinal direction can be obtained, and thus, the vehicle light with aesthetic design can be provided.

In one embodiment, the reflection intensity of the incident light on the reflection portion may be larger in a portion away from the light source than in a portion close to the light source.

With this configuration, the light-emission intensity is increased even at a position away from the light source so that the vehicle light with aesthetic design can be provided.

In one embodiment, the reflection portion may be a dot portion constituted by a large number of recesses and/or a large number of projections disposed on a back surface of the light-transmitting plate, and the number of the recesses and/or the projections per a unit area may be larger in a portion away from the light source than in a portion close to the light source.

Light incident on the light-transmitting plate from the light source travels in the light-transmitting plate and is reflected on the wall surfaces of the recesses and/or the projections toward the front surface. Then, as the number of the recesses and/or the projections per a unit area increases, the reflection intensity of incident light increases. Accordingly, increase in the number of the recesses and/or the projections in a region away from the light source relative to a region close to the light source enables the vehicle light to have aesthetic design and a light-emission mode in which the light-emission intensity increases as the distance from the light source increases.

In one embodiment, the reflection portion may be a dot portion constituted by a large number of recesses and/or a large number of projections disposed on a back surface of the light-transmitting plate, and a size of the recesses and/or the projections may be larger in a portion away from the light source than in a portion close to the light source.

Light incident on the light-transmitting plate from the light source travels in the light-transmitting plate, and is reflected on the wall surfaces of the recesses and/or the projections, that is, on the reflection surfaces, toward the front surface. Then, as the size of the recesses and/or the projections increases, the area of the reflection surfaces that reflect incident light increases, and thus, the reflection intensity of incident light increases. Accordingly, increase in the size of the recesses and/or the projections in a region away from the light source relative to a region close to the light source enables the vehicle light to have aesthetic design and a light-emission mode in which the light-emission intensity increases as the distance from the light source increases.

In one embodiment, the reflection portion may be a dot portion constituted by a large number of recesses and/or a large number of projections disposed on a back surface of the light-transmitting plate, and a pitch of the recesses and/or the projections may be smaller in a portion away from the light source than in a portion close to the light source.

Light incident on the light-transmitting plate from the light source travels in the light-transmitting plate and is reflected on the wall surfaces of the recesses and/or the projections toward the front surface. Then, as the pitch of the recesses and/or the projections decreases, the area of the reflection surfaces that reflect incident light per a unit area increases, and thus, the reflection intensity of incident light increases. Accordingly, reduction in the pitch of the recesses and/or the projections in a region away from the light source relative to a region close to the light source enables the vehicle light to have aesthetic design and a light-emission mode in which the light-emission intensity increases as the distance from the light source increases.

In one embodiment, the vehicle light may further include a sub-light-emitting part extending in a vehicle longitudinal direction in a vertically intermediate portion of the light-transmitting plate, the reflection portion may be a dot portion constituted by a large number of recesses and/or a large number of projections disposed on a back surface of the light-transmitting plate, and the recesses may be continuously provided along the sub-light-emitting part at a location adjacent to the sub-light-emitting part.

The area of the reflection surfaces of the recesses on which incident light is reflected is larger than that of the projections. In this embodiment, the presence of recesses at a location adjacent to the sub-light-emitting part can increase the light-emission intensity around the sub-light-emitting part. Then, natural light expansion from the sub-light-emitting part to the light-transmitting plate can be expressed, and thus, the vehicle can be provided with aesthetic design.

In one embodiment, the reflection portion may be a dot portion constituted by a large number of recesses and a large number of projections disposed on a back surface of the light-transmitting plate, and the projections may be disposed in a region where the reflection intensity of the incident light needs to be reduced, whereas the recesses may be disposed in a region where the reflection intensity needs to be increased.

The area of the reflection surfaces of the recesses on which incident light is reflected is larger than that of the projections. In this embodiment, the projections are disposed on a region where the reflection intensity needs to be reduced, whereas the recesses are provided on a region where the reflection intensity needs to be increased so that the light-emission intensity at intended positions can be adjusted. In this manner, a natural light-emitting mode can be obtained, and thus, the vehicle light can be provided with aesthetic design.

The light-transmitting plate may include a first guide portion extending in the vehicle longitudinal direction in an upper portion of the sub-light-emitting part and a second guide portion extending in the vehicle longitudinal direction in a lower portion of the sub-light-emitting part, the first guide portion guides a part of the incident light to a space above the sub-light-emitting part and the second guide portion guides the other part of the incident light to a space below the sub-light-emitting part.

In a case where a light-emitting region is provided around a vehicle constituent member, the configuration may be modified such that two light-transmitting plates are disposed at the upper and lower sides of the vehicle constituent member, and a light source is provided on each of the light-transmitting plates so that a light-emitting region is formed around the members. However, the increases in the numbers of light-transmitting plates and the light sources are not preferable in terms of costs and power consumption. The configuration disclosed here employs the light-transmitting plate including the first guide portion and the second guide portion disposed at upper and lower sides of the sub-light-emitting part in order to avoid the location of the sub-light-emitting part, and incident light from one light source is divided to the first guide portion and the second guide portion. Accordingly, a light-emitting region around the sub-light-emitting part can be formed by using one set of the light-transmitting plate and the light source. In this manner, the vehicle light has aesthetic design, can be manufactured at low costs, and shows low power consumption.

The sub-light-emitting part may be a turn light, for example.

In a case where the sub-light-emitting part is a turn light, the presence of the light-emitting region around the sub-light-emitting part can express natural light expansion around the sub-light-emitting part. Accordingly, the vehicle light has enhanced aesthetic design.

In an alternative configuration, the light source is disposed at the front surface of the light-transmitting plate, incident light from the light source enters the light-transmitting plate from the front surface of the light-transmitting plate, and the light-transmitting plate includes a spectroscopic section for dividing the incident light to the first guide portion and the second guide portion, at the back surface facing the front surface at a location where the light source is disposed.

The spectroscopic section for forcibly dividing the incident light from light source to the first guide portion and the second guide portion can increase the amount of incident light guided to the first guide portion and the second guide portion. In this manner, a sufficient light-emission intensity can be obtained in the light-transmitting plate.

In addition, the spectroscopic section may be a groove that has a V shape in cross section, is recessed toward the front surface, and extends in the vehicle longitudinal direction.

With the groove having a V shape in cross section that is recessed toward the front surface, since the wall surface of the groove is sloped relative to incident light, the incident light is reflected on the slopes and is divided into an upper portion and a lower portion. In this manner, the incident light can be divided to the first guide portion and the second guide portion with a simple configuration.

DETAILED DESCRIPTION

Embodiments of the present disclosure will be described in detail with reference to the drawings. The following preferred embodiments are merely examples in nature, and are not intended to limit the disclosure, applications, and use of the applications.

First Embodiment

<Rear Light>

Figure 1:
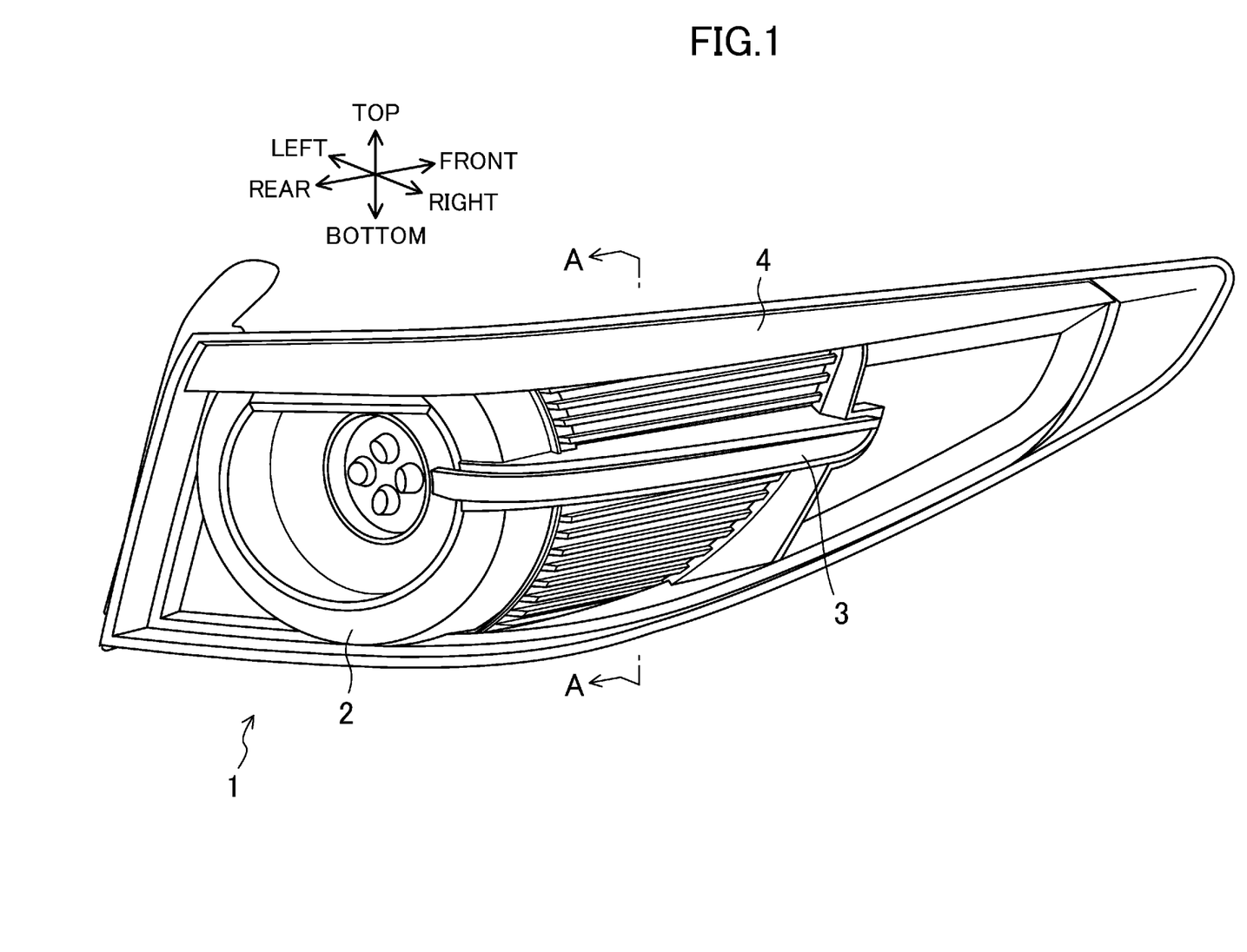
FIG. 1 is a perspective view illustrating a rear light according to a first embodiment in a state where a transparent cover is detached.
Figure 2:
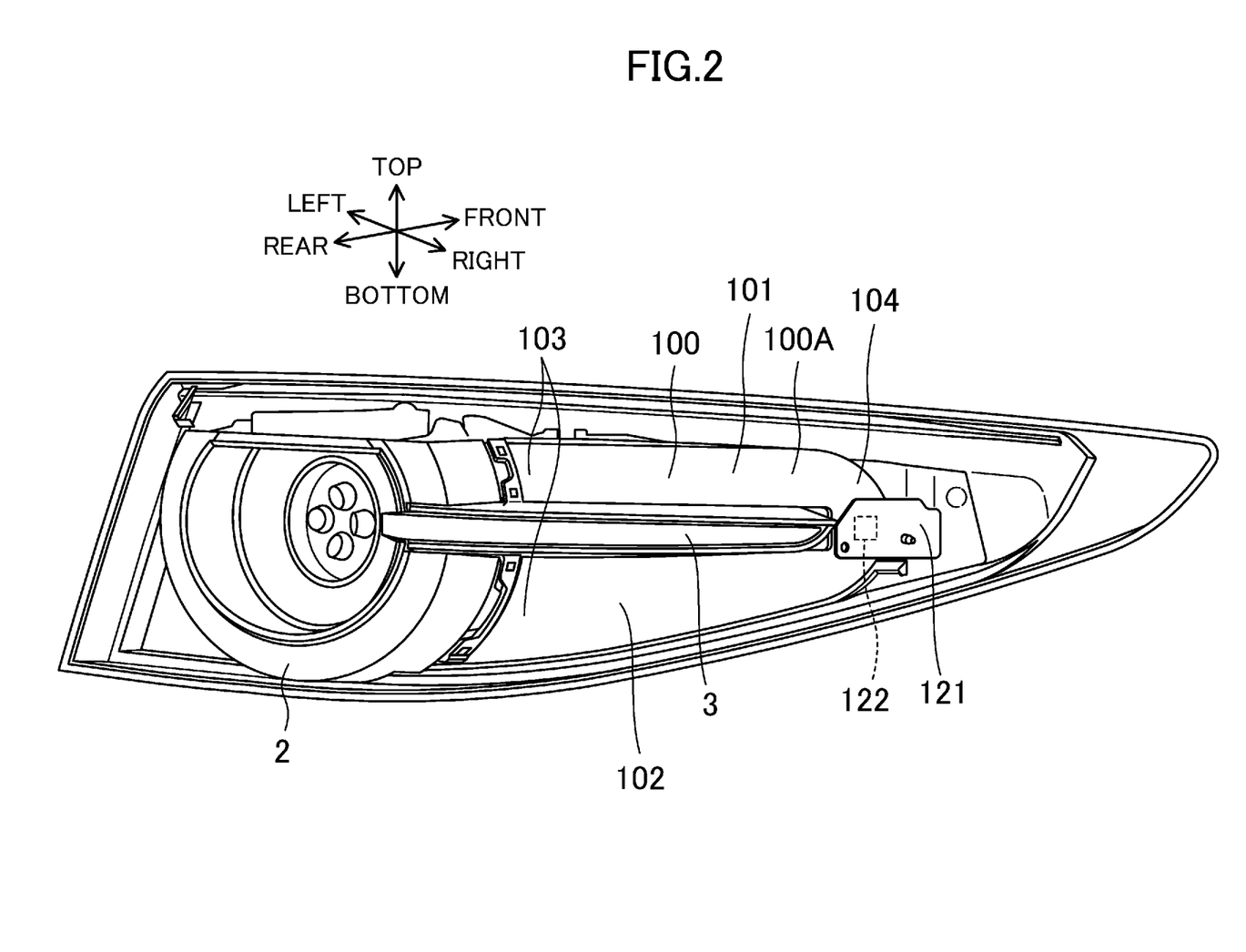
FIG. 2 illustrates the rear light shown FIG. 1 in a state where an outer frame is detached.
Figure 3:
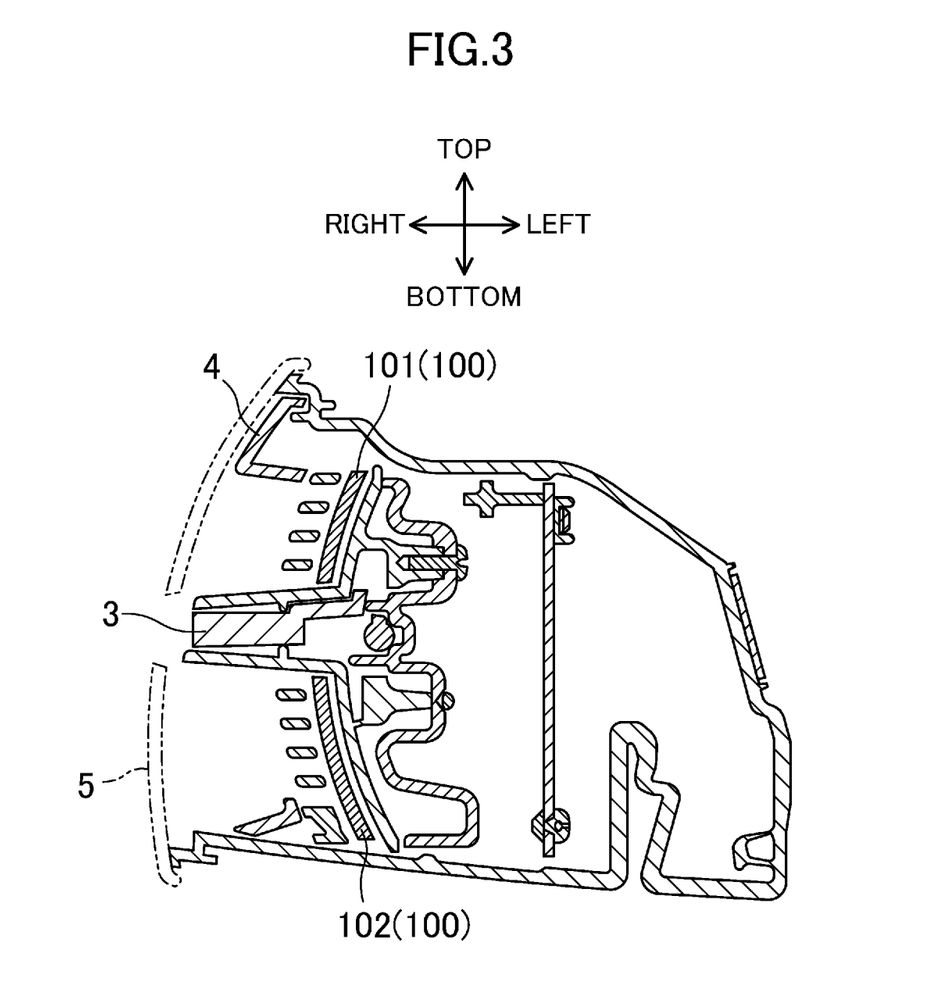
FIG. 3 is a cross-sectional view taken along line A-A in FIG. 1, and illustrates the transparent cover by an imaginary line.

FIGS. 1 through 3 illustrate an appearance and an internal structure of a rear light 1 as a vehicle light according to this embodiment. The rear light 1 is a light disposed at a right rear portion of a vehicle (not shown).

Directions herein are defined with respect to the vehicle for convenience of description. Specifically, as illustrated in FIG. 1, a front-rear direction of the vehicle will be referred to as a longitudinal direction, a top-bottom direction of the vehicle will be referred to as a vertical direction, and left and right of the vehicle when seen from the rear will be referred to as "left" and "right," respectively.

As illustrated in FIGS. 1 and 3, the rear light 1 includes: a ring-shaped rear light body (taillight) 2 as a main light-emitting part that emits light toward the rear of the vehicle; a turn light 3 (sub-light-emitting part, vehicle constituent member) as a light-emitting member continuous to a light-emitting region of the rear light body 2 and extending in the vehicle longitudinal direction; and an outer frame 4 and a transparent cover 5 configured to protect these members and enhance aesthetic design of the rear light 1. Although FIG. 1 illustrates the rear light 1 in a state where the transparent cover 5 is detached, FIG. 3 shows the transparent cover 5 by an imaginary line for understanding.

<Light-Transmitting Plate and Light Source>

As illustrated in FIGS. 2 and 3, a light-transmitting plate 100 located that sandwiches the top and bottom of the turn light 3, is continuous to the rear light body 2, and extends in the vehicle longitudinal direction is disposed inside the outer frame 4. The light-transmitting plate 100 has a rear end 103 connected to the rear light body 2, and has a front end 104 (i.e., an end opposite to a position at which the main light-emitting part is disposed) provided with a board 121 on which a light source 122 constituted by an LED light is mounted. As described above, in the rear light 1, the rear light body 2 is disposed at the right rear end of the vehicle, and the turn light 3, the light-transmitting plate 100, and the light source 122 are disposed at the right side surface of the vehicle. The light-transmitting plate 100 and the light source 122 form a light-emitting region located around the turn light 3, continuous to the rear light body 2, and extending forward.

The light-transmitting plate 100 is used for guiding incident light from the light source 122, and is, for example, a transparent plate member of, for example, an acrylic resin. The light-transmitting plate 100 may be a flat member or a gently curved member, depending on design of the rear light 1.

Figure 4:
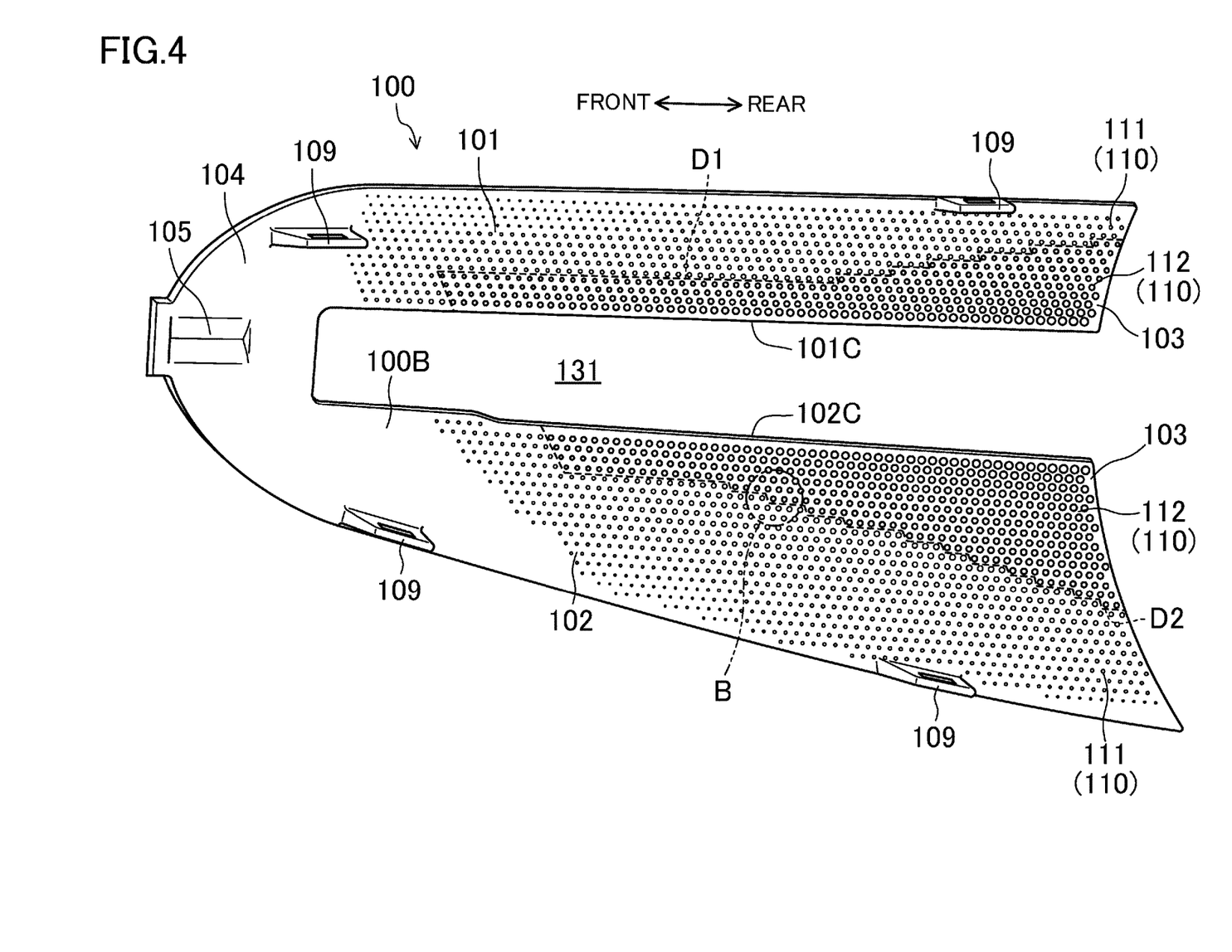
FIG. 4 is a rear view of a light-transmitting plate.
Figure 5:
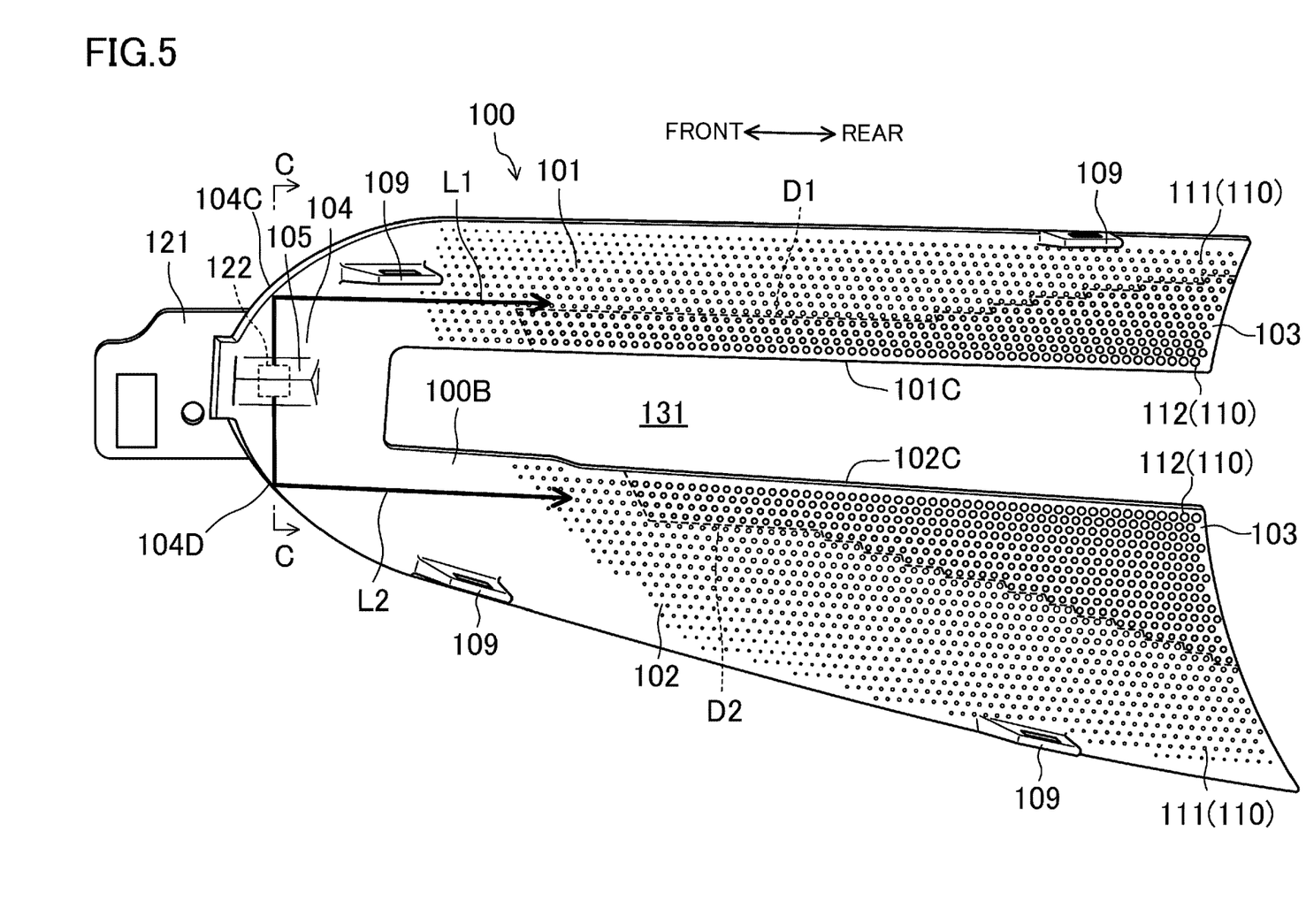
FIG. 5 illustrates a state where a light source is placed on the light-transmitting plate shown in FIG. 4.

As illustrated in FIGS. 4 and 5, a plurality of nails 109, 109, . . . are disposed at a back surface 100B of the light-transmitting plate 100. The nails 109, 109, . . . are engaged with unillustrated engagement portions of the vehicle body so that the light-transmitting plate 100 is attached to the vehicle body.

A slit 131 extending in the vehicle longitudinal direction is formed in a vertically intermediate portion of the light-transmitting plate 100. The turn light 3 is disposed in the slit 131. That is, the light-transmitting plate 100 is branched by the slit 131 into a first guide portion 101 extending from the front end 104 rearward above the turn light 3 and a second guide portion 102 extending from the front end 104 reward below the turn light 3. The first guide portion 101 guides a part of incident light from the light source 122 to a space above the turn light 3, and the second guide portion 102 guides the other part of the incident light to a space below the turn light 3.

In this manner, the light-transmitting plate 100 having the branched portion and one light source 122 form a light-emitting region around the turn light 3 so that the rear light 1 has enhanced aesthetic design, can be manufactured at low costs, and shows low power consumption.

<Groove>

Figure 6:
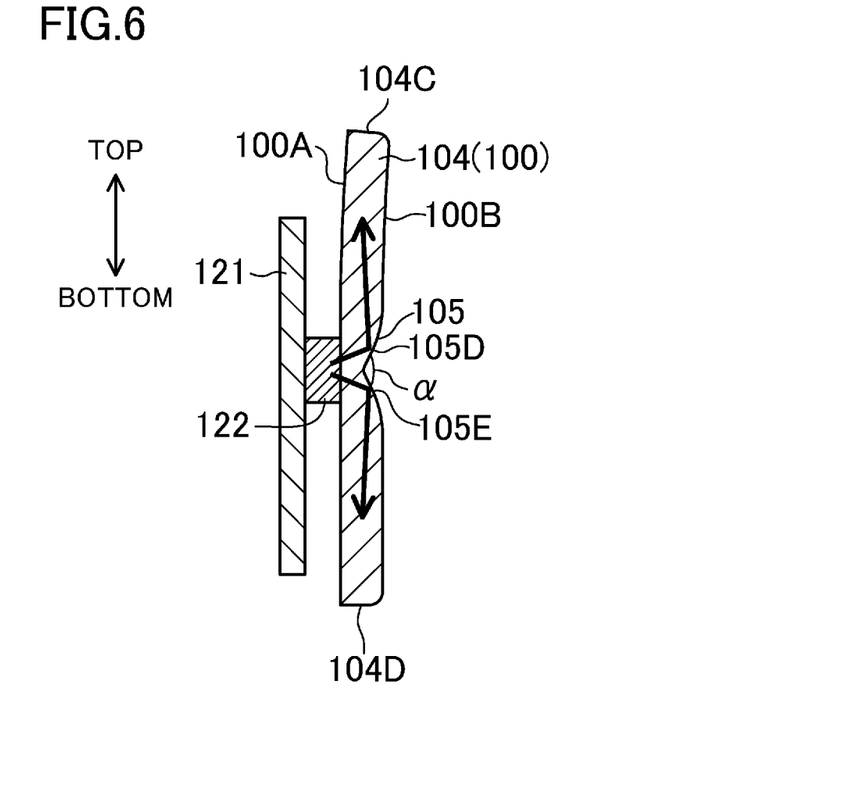
FIG. 6 is a cross-sectional view taken along line C-C in FIG. 5.

As illustrated in FIG. 2, the light source 122 is disposed at a front surface 100A of the front end 104. As illustrated in FIGS. 5 and 6, the back surface 100B facing the front surface 100A has a groove 105 (spectroscopic section) at a position where the light source 122 of the light-transmitting plate 100 is disposed. The groove 105 has a V shape in cross section, is recessed toward the front surface 100A, and extends in the vehicle longitudinal direction.

As indicated by arrows in FIG. 6, incident light from the light source 122 enters the light-transmitting plate 100 from the front surface 100A of the front end 104 of the light-transmitting plate 100. The incident light is reflected by slopes 105D and 105E of the groove 105, and is divided in the vertical direction. As indicated by arrows L1 and L2 in FIG. 5, the divided incident light is reflected on wall surfaces of an upper curved portion 104C and a lower curved portion 104D of the front end 104 of the light-transmitting plate 100, and travels toward the first guide portion 101 and the second guide portion 102.

In the manner described above, the groove 105 as a spectroscopic section for forcibly dividing incident light from the light source 122 into the first guide portion 101 and the second guide portion 102 can increase the amount of incident light guided to the first guide portion 101 and the second guide portion 102 with a simple configuration. Accordingly, a sufficient light-emission intensity can be obtained in the light-transmitting plate 100.

An angle α formed by the slopes 105D and 105E of the groove 105 illustrated in FIG. 6 is 30 degrees or more and 120 degrees or less, for example, from the viewpoint of efficiently dividing incident light from the light source 122 in the vertical direction.

<Dot Portion>

As illustrated in FIGS. 4 and 5, the light-transmitting plate 100 has a dot portion 110 (reflection portion) constituted by a large number of projections 111 and a large number of recesses 112 disposed on portions of the back surface 100B at the back of the first guide portion 101 and the second guide portion 102. The dot portion 110 is used for reflecting incident light toward the front surface 100A. The dot portion 110 extends from a portion near the front end 104 to the rear end 103 in the first guide portion 101, and extends from an intermediate portion near the front end 104 to the rear end 103 in the second guide portion 102.

Figure 7:
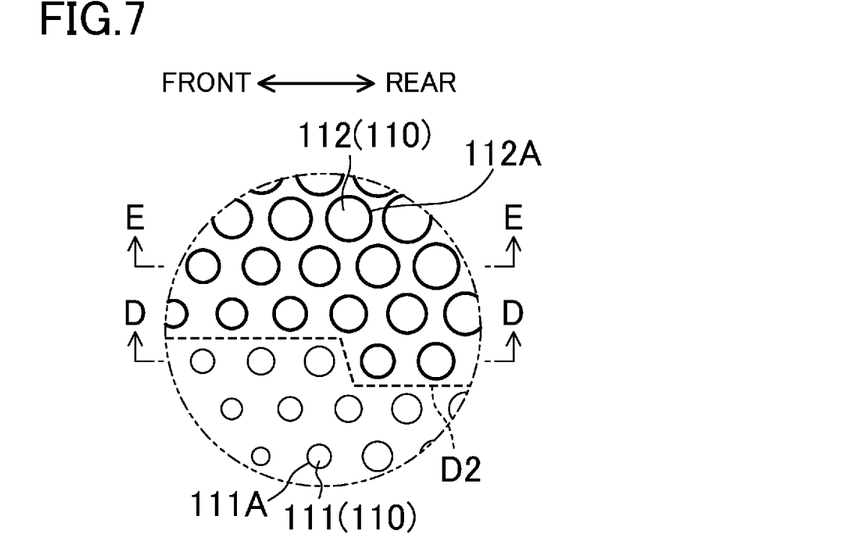
FIG. 7 is an enlarged view of a region B in FIG. 4.
Figure 8:
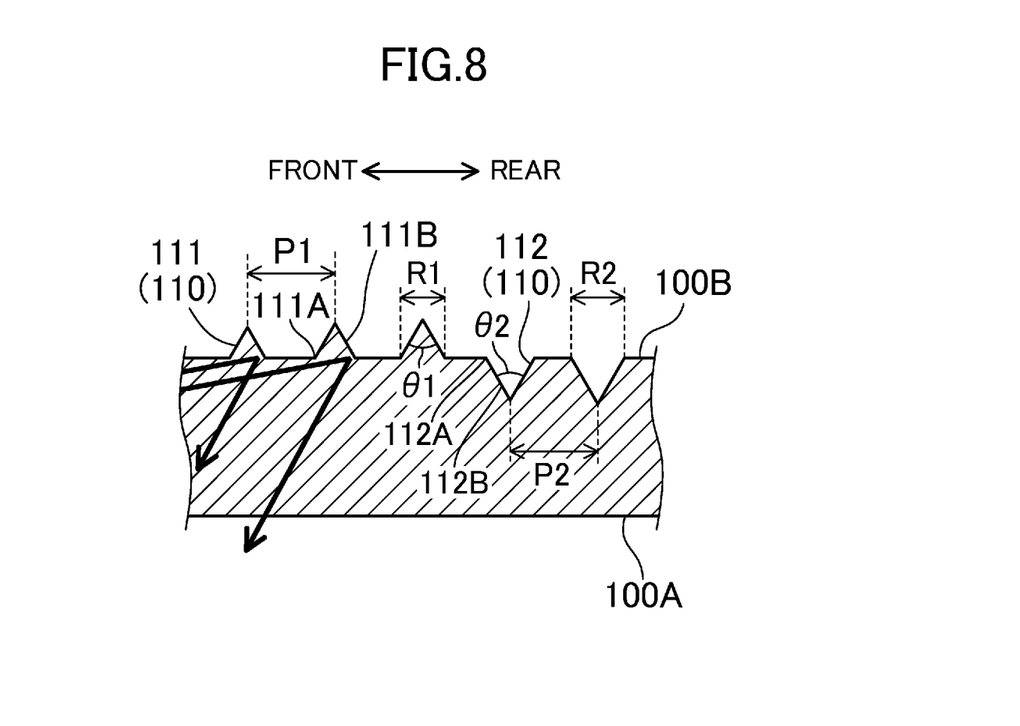
FIG. 8 is a cross-sectional view taken along line D-D in FIG. 7.

As illustrated in FIGS. 7 and 8, the projections 111 are conical projections having circular bases 111A as bottom surfaces at the back surface 100B. As indicated by arrows in FIG. 8, incident light traveling from the front, hits side surfaces 111B of the projections 111 and is reflected toward the front surface 100A.

Figure 9:
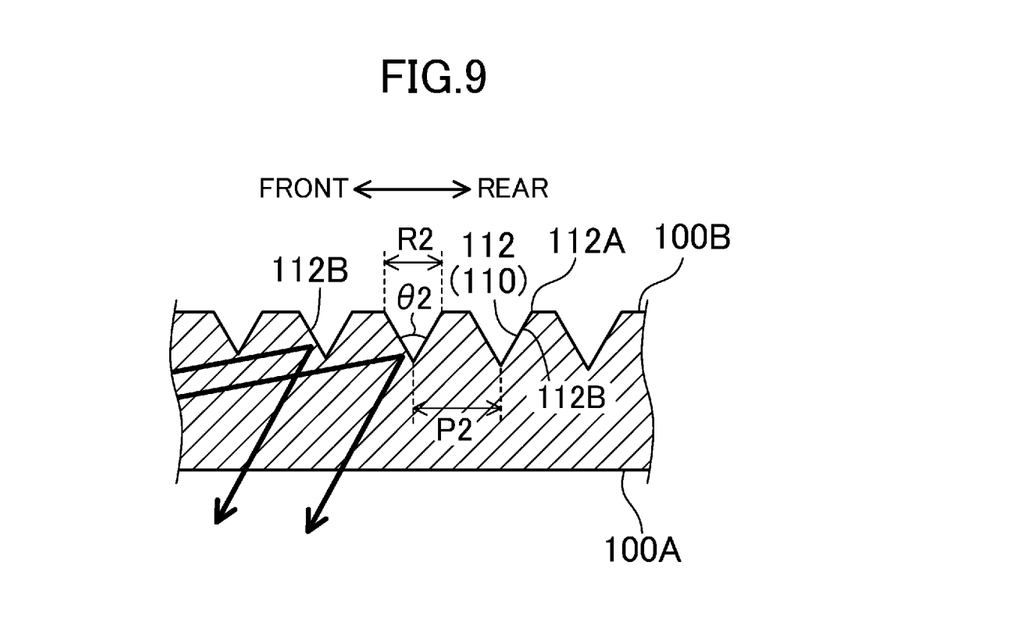
FIG. 9 is a cross-sectional view taken along line E-E in FIG. 7.

As illustrated in FIGS. 7 through 9, the recesses 112 are conical recesses having openings 112A as bottom surfaces at the back surface 100B. As indicated by arrows in FIG. 9, incident light entering from the front, hits side surfaces 112B of the recesses 112 and is reflected toward the front surface 100A.

Incident light is reflected or transmitted on or through the walls of the light-transmitting plate 100, and travels to the outside of the light-transmitting plate 100. Then, when seen from the outside of the vehicle, that is, from the front surface 100A, the light-transmitting plate 100 seems to emit light. Here, in the rear light 1 according to this embodiment, reflection of incident light in the dot portion 110 constituted by the projections 111 and the recesses 112 increases reflection intensity of incident light in portions of the light-transmitting plate 100 where the dot portion 110 is formed, and when seen from the front surface 100A, especially the light-transmitting plate 100 seems to emit light strongly.

As schematically illustrated in FIGS. 4 and 5, the sizes of the projections 111 and the recesses 112, that is, a radius R1 of each of the bases 111A and a radius R2 of each of the openings 112A gradually increase from the front end 104 close to the light source 122 to the rear end 103 away from the light source 122. As the radii R1 and R2 increase, the area of the side surfaces 111B and 112B that reflect incident light increases, and thus, the reflection intensity of incident the light increases. Since the reflection intensity of incident light in the dot portion 110 gradually increases toward the rear light body 2 connected to the rear end 103, natural decrease in light-emission intensity continuous to the rear light body 2 can be expressed, and thus, the rear light 1 showing natural light-emission and having aesthetic design can be obtained.

As illustrated in FIGS. 4 and 5, the rear light 1 according to this embodiment is configured such that the radii R1 and R2 of the projections 111 and the recesses 112 increase toward the turn light 3 in addition to the rear light body 2. In this manner, the light-emission intensity of the light-emitting region increases toward the turn light 3 in addition to the rear light body 2.

To gradually increase the reflection intensity of incident light in the dot portion 110 toward the rear light body 2 and the turn light 3, instead of or in addition to the configuration in which the radii R1 and R2 gradually increase, a configuration in which a pitch P1 of the projections 111 and a pitch P2 of the recesses 112 illustrated in FIGS. 8 and 9 gradually decrease toward the rear light body 2 and the turn light 3, may be employed, may be employed. Instead of or in addition to the gradual increase of the radii R1 and R2 and/or the gradual decrease of the pitches P1 and P2, the number of the projections 111 and the recesses 112 per a unit area may gradually increase toward the rear light body 2 and the turn light 3. As described above, in the dot portion 110, the radii R1 and R2, the pitches P1 and P2, and/or the number, per a unit area, of the projections 111 and/or the recesses 112 are changed, especially gradually changed, so that incident light can be reflected with different reflection intensities depending on a position on the light-transmitting plate 100, and thereby, light-emission intensity can be changed, especially gradually changed.

In addition, as illustrated in FIG. 8, the side surfaces 111B of the projections 111 are disposed outside the light-transmitting plate 100 relative the back surface 100B, whereas the side surfaces 112B of the recesses 112 are located inside the light-transmitting plate 100 relative to the back surface 100B. Then, even in a case where the radii R1 and R2 are the same, the recesses 112 has a large side surface area on which incident light enters than the projections 111. As described above, since the reflection intensity of incident light is larger in the recesses 112 than the projections 111, the light-emission intensity of the light-transmitting plate 100 is larger in a position where the recesses 112 are provided than a portion where the projections 111 are provided. Accordingly, the projections 111 are provided in a region where the reflection intensity of incident light needs to be reduced, whereas the recesses 112 are provided in a region where the reflection intensity needs to be increased so that the light-emission intensity at intended positions can be adjusted.

In the rear light 1 according to this embodiment, the recesses 112 are continuously provided along the turn light 3 at positions near ends 101C and 102C adjacent to the turn light 3 of the light-transmitting plate 100. Specifically, as illustrated in FIGS. 4 and 5, in a region near the slit 131 from boundaries D1 and D2, the recesses 112 are disposed along the ends 101C and 102C, and in the other regions, the projections 111 are disposed. With this configuration, the light-emission intensity of the light-transmitting plate 100 around the turn light 3 can be increased so that natural light expansion around the turn light 3 can be expressed.

As described above, in the rear light 1 according to this embodiment, the dot portion 110 is configured such that the reflection intensity of incident light increases in a region of the light-transmitting plate 100 where the light-emission intensity needs to be increased, for example, a peripheral portion of a light-emitting member such as the rear light body 2 or the turn light 3, whereas the reflection intensity of incident light decreases in a region where the light-emission intensity needs to be reduced. Thus, the rear light 1 can have aesthetic design and has its light-emission intensity increased at an intended position, independently of the distance from the light source 122.

The radii R1 and R2 are preferably 0.5 mm or more and 2 mm or less. Each of the number of the recesses 112 and the number of the projections 111 is preferably 25/cm$^2$ or more and 400/cm$^2$ or less. The pitches P1 and P2 are preferably 0.5 mm or more and 2 mm or less. When these values are below the lower limits thereof, the reflection intensity of incident light in the dot portion 110 is insufficient so that it might be difficult to obtain a sufficient light-emission intensity of the light-transmitting plate 100. When these values exceed the upper limits thereof, the reflection intensity of reflection light in a portion near the light source 122 increases, and the amount of incident light reaching a portion away from the light source 122 is insufficient so that the reflection intensity in this region is insufficient and it might be difficult to obtain a sufficient light-emission intensity of the light-transmitting plate 100. The distance between vertexes of adjacent ones of the projections 111 and the distance between vertexes of adjacent ones of the recesses 112 may be defined in accordance with the pitches P1 and P2.

The direction of reflected light can be adjusted by adjusting a vertex angle θ1 of the cones of the bases 111A illustrated in FIG. 8 and a vertex angle θ2 of the cones of the recesses 112 illustrated in FIG. 9, and thus, the light-emission mode of the light-transmitting plate 100 can be finely adjusted. Specifically, from the viewpoint of obtaining a sufficient light-emission intensity of the light-transmitting plate 100 when seen from the outside of the vehicle, the vertex angles θ1 and θ2 are preferably 30 degrees or more and 120 degrees or less, and more preferably 30 degrees or more and 50 degrees or less.

Second Embodiment

Another embodiment of the present disclosure will now be described in detail. In the following description of the embodiment, components already described in the first embodiment are denoted by the same reference characters, and will not be described again in detail.

Figure 10:
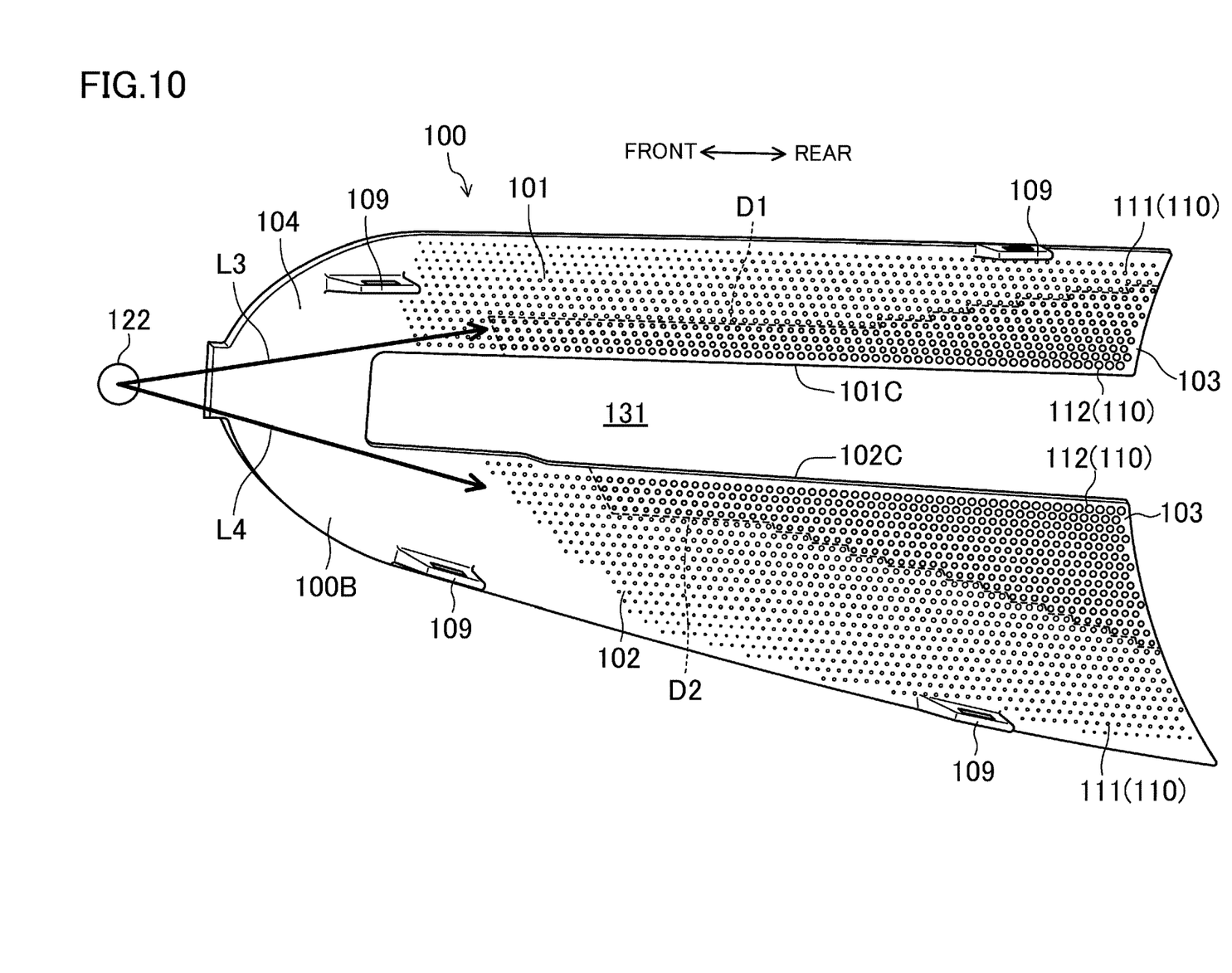
FIG. 10 illustrates a light-transmitting plate employed in a rear light according to a second embodiment and corresponds to FIG. 5.

FIG. 10 illustrates a light-transmitting plate 100 of a rear light 1 according to a second embodiment. In this embodiment, a light source 122 is disposed forward of a front end 104 of the light-transmitting plate 100. As indicated by characters L3 and L4, incident light on the front end 104 of the light-transmitting plate 100 from the light source 122 is divided by a slit 131, and enters a first guide portion 101 and a second guide portion 102. In this manner, without a spectroscopic section such as a groove 105, the slit 131 can serve as a spectroscopic section.

The light source 122 is an LED light in the first embodiment, but is not limited to this example, and may be another light-emitting section such as an incandescent lamp.

OTHER EMBODIMENTS

In the first embodiment, the groove 105 is provided as a spectroscopic section. However, the spectroscopic section is not limited to the groove 105, and may be a configuration in which a plurality of recesses of quadrangular pyramids are arranged in the longitudinal direction as long as incident light is divided to the first guide portion 101 and the second guide portion 102. The slopes 105D and 105E may be mirror surfaces.

In the embodiments described above, the dot portion 110 is constituted by the large number of projections 111 and the large number of recesses 112. Alternatively, the dot portion 110 may be constituted by either a large number of recesses or a large number of projections. The locations of the projections 111 and/or the recesses 112 are not limited to those in the embodiments, and may be changed as appropriate such that the light-emission intensity of the light-transmitting plate 100 increases or decreases at desired positions. The range of formation of the dot portion 110 is not limited to those in the embodiments, and may be changed as appropriate in accordance with an intended light-emission mode. Specifically, in FIG. 4, for example, in a case where the range of formation of the dot portion 110 is limited to a narrow range near the slit 131 and the rear end 103, a narrow light range around the rear light body 2 and the turn light 3 can be expressed. On the other hand, in a case where the range of formation of the dot portion 110 is expanded to a wider range toward the front end 104 as in the configuration of FIG. 4 or wider than that in FIG. 4, a wide light range around the rear light body 2 and the turn light 3 can be expressed.

In the embodiments, the shapes of the large number of projections 111 and the large number of recesses 112 constituting the dot portion 110 are conical shapes, but are not limited to conical shapes, and may be other shapes such as truncated conical shapes, multi-pyramid shapes, or truncated multi-pyramid shapes. The configuration of the reflection portion is not limited to the dot portion 110 of the embodiments as long as incident light can be reflected toward the front surface 100A, and may be other configurations including reflection surfaces and grooves and/or ribs having a linear shape or a lattice pattern with a V shape in cross section.

The rear light 1 of the embodiments has the configuration in which the ring-shaped rear light body 2 incorporates the turn light 3, but is not limited to this configuration. Specifically, the rear light body 2 is not limited to a ring shape, and may be other shapes such as a hemisphere or a polyhedron. In the rear light 1, the rear light body 2 may not incorporate the turn light 3, and may incorporate other vehicle components such as another light-emitting member or a frame instead of or in addition to the turn light 3. In a configuration in which the turn light 3 is not incorporated, for example, a light-transmitting plate 100 including no slit 131 and having no branching structure may be employed. In a configuration in which another light-emitting member or a vehicle constituent member is incorporated, the slit 131 may be configured to divide incident light into three or more parts or has a through hole, for example, in accordance with the shape of the other light-emitting member or the vehicle constituent member.

In the embodiments, the vehicle light is the rear light disposed at a right rear portion of the vehicle, and may be a rear light disposed at a left rear portion. In addition, the vehicle light is not limited to the rear light, and may be a headlight, a small light, a fog light, or a cornering light disposed in a front portion of the vehicle, or a combination of two or more of these lights, a brake light or a turn light disposed in a rear portion of the vehicle or a combination of these lights, for example.

What is claimed is:

1. A vehicle light disposed in a front portion or a rear portion of a vehicle, the vehicle light comprising:
   a light source;
   a light-transmitting plate that guides incident light from the light source;
   a reflection portion disposed on the light-transmitting plate, the reflection portion being configured to reflect the incident light toward outside of the vehicle with a reflection intensity that varies depending on a position on the light-transmitting plate;
   a main light-emitting part that illuminates space in front of or at rear of the vehicle; and
   a sub-light-emitting part extending in a vehicle longitudinal direction, wherein
   the light-transmitting plate is disposed above and below the sub-light-emitting part and extends from the main light-emitting part in a vehicle longitudinal direction, and the reflection intensity of the incident light on the reflection portion increases toward the sub-light-emitting part.

2. The vehicle light according to claim 1, wherein the reflection intensity of the incident light on the reflection portion gradually changes in accordance with a distance from the light source.

3. The light according to claim 1, wherein
the light-transmitting plate is disposed at a side surface of the vehicle,
the light-transmitting plate includes the light source at an end opposite to a position where the main light-emitting part is disposed, and
the reflection intensity of the incident light on the reflection portion gradually increases toward the main light-emitting part.

4. The vehicle light according to claim 1, wherein the reflection intensity of the incident light on the reflection portion gradually changes in a vehicle longitudinal direction.

5. The vehicle light according to claim 1, wherein the reflection intensity of the incident light on the reflection portion is larger in a portion away from the light source than in a portion close to the light source.

6. The vehicle light according to claim 5, wherein the reflection portion is a dot portion constituted by a large number of recesses and/or a large number of projections disposed on a back surface of the light-transmitting plate, and
the number of the recesses and/or the projections per a unit area is larger in a portion away from the light source than in a portion close to the light source.

7. The vehicle light according to claim 5, wherein the reflection portion is a dot portion constituted by a large number of recesses and/or a large number of projections disposed on a back surface of the light-transmitting plate, and
a size of the recesses and/or the projections is larger in a portion away from the light source than in a portion close to the light source.

8. The vehicle light according to claim 5, wherein the reflection portion is a dot portion constituted by a large number of recesses and/or a large number of projections disposed on a back surface of the light-transmitting plate, and
a pitch of the recesses and/or the projections is smaller in a portion away from the light source than in a portion close to the light source.

9. The vehicle light according to claim 1, wherein
the reflection portion is a dot portion constituted by a large number of recesses and/or a large number of projections disposed on a back surface of the light-transmitting plate, and
the recesses are continuously provided along the sub-light-emitting part at a location adjacent to the sub-light-emitting part.

10. The vehicle light according to claim 1, wherein the reflection portion is a dot portion constituted by a large number of recesses and a large number of projections disposed on a back surface of the light-transmitting plate, and
the projections are disposed in a region where the reflection intensity of the incident light needs to be reduced, whereas the recesses are disposed in a region where the reflection intensity needs to be increased.

11. The vehicle light according to claim 1, wherein
the reflection portion is a dot portion constituted by a large number of recesses and a large number of projections disposed on a back surface of the light-transmitting plate,
the light-transmitting plate includes a first region having a large number of recesses along the sub-light-emitting part at positions near ends adjacent to the sub-light-emitting part, and includes a second region having a large number of projections at upper and lower sides of the first region, and
the first region expands in a top-bottom direction toward the main-light-emitting part.

12. The vehicle light according to claim 1, wherein
the light-transmitting plate branches into a first guide portion extending, from the light source, in the vehicle longitudinal direction in an upper portion of the sub-light-emitting part and a second guide portion extending, from the light source, in the vehicle longitudinal direction in a lower portion of the sub-light-emitting part, the first guide portion guides a part of the incident light to a space above the sub-light-emitting part and the second guide portion guides the other part of the incident light to a space below the sub-light-emitting part, and
a light-emission intensity of the reflection portion of the first guide portion increases toward the lower portion, and a light-emission intensity of the reflection portion of the second guide portion decreases toward the upper portion.

13. The vehicle light according to claim 1, wherein
the reflection portion is a dot portion constituted by a large number of recesses and a large number of projections disposed on a back surface of the light-transmitting plate,
the main light-emitting part emits light toward the rear of the vehicle, and
the sub-light-emitting part is a turn light.

14. A vehicle light disposed in a front portion or a rear portion of a vehicle, the vehicle light comprising:
a light source;
a light-transmitting plate that guides incident light from the light source;
a reflection portion disposed on the light-transmitting plate, the reflection portion being configured to reflect the incident light toward outside of the vehicle with a reflection intensity that varies depending on a position on the light-transmitting plate;
a main light-emitting part that illuminates space in front of or at rear of the vehicle; and
a sub-light-emitting part extending in a vehicle longitudinal direction, wherein;
the light-transmitting plate is disposed above and below the sub-light-emitting part and extends from the main light-emitting part in a vehicle longitudinal direction,
the light-transmitting plate and the light source form, around the sub-light-emitting part, a light-emitting region continuous from the main light-emitting part, and
a light-emission intensity of the light-emitting region gradually increases toward the main light-emitting part, and increases toward the sub-light-emitting part.

15. The vehicle light according to claim 14, wherein
the reflection portion is a dot portion constituted by a large number of recesses and a large number of projections disposed on a back surface of the light-transmitting plate, the light-transmitting plate includes a first region having a large number of recesses along the sub-light-emitting part at positions near ends adjacent to the sub-light-emitting part, and includes a second region having a large number of projections at upper and lower sides of the first region, and the first region expands in a top-bottom direction toward the main-light-emitting part.

16. The vehicle light according to claim 14, wherein the light-transmitting plate branches into a first guide portion extending, from the light source, in the vehicle longitudinal direction in an upper portion of the sub-light-emitting part and a second guide portion extending, from the light source, in the vehicle longitudinal direction in a lower portion of the sub-light-emitting part, the first guide portion guides a part of the incident light to a space above the sub-light-emitting part and the second guide portion guides the other part of the incident light to a space below the sub-light-emitting part, and a light-emission intensity of the reflection portion of the first guide portion increases toward the lower portion, and a light-emission intensity of the reflection portion of the second guide portion decreases toward the upper portion.

17. The vehicle light according to claim 14, wherein the reflection portion is a dot portion constituted by a large number of recesses and a large number of projections disposed on a back surface of the light-transmitting plate, the main light-emitting part emits light toward the rear of the vehicle, and the sub-light-emitting part is a turn light.

* * * * *